(12) United States Patent
Littau

(10) Patent No.: US 8,900,435 B2
(45) Date of Patent: Dec. 2, 2014

(54) SEPARATING GAS USING ION EXCHANGE

(75) Inventor: Karl Anthony Littau, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 956 days.

(21) Appl. No.: 11/960,029

(22) Filed: Dec. 19, 2007

(65) Prior Publication Data

US 2009/0159456 A1 Jun. 25, 2009

(51) Int. Cl.
*B01D 53/32* (2006.01)
*B01J 35/06* (2006.01)
*B01J 23/42* (2006.01)

(52) U.S. Cl.
CPC .......... *B01D 53/326* (2013.01); *B01D 2251/21* (2013.01); *B01D 2251/208* (2013.01); *B01D 2257/504* (2013.01); *B01J 35/065* (2013.01); *B01J 23/42* (2013.01); *B01D 2251/202* (2013.01); *B01D 2255/1021* (2013.01)
USPC ........................... 204/630; 204/539; 204/252

(58) Field of Classification Search
None
See application file for complete search history.

(56) References Cited

U.S. PATENT DOCUMENTS

| | | | | |
|---|---|---|---|---|
| 2,800,445 A | * | 7/1957 | Clarke | 204/539 |
| 3,511,712 A | | 3/1967 | Giner | |
| 3,676,220 A | | 7/1972 | Ward, III | |
| 3,896,015 A | * | 7/1975 | McRae | 204/522 |
| 4,002,493 A | | 1/1977 | Warszawski | |
| 4,117,079 A | | 9/1978 | Bellows | |
| 4,250,000 A | * | 2/1981 | Kuck et al. | 205/452 |
| 4,707,224 A | * | 11/1987 | Shabrang | 205/498 |
| 5,133,842 A | * | 7/1992 | Taylor et al. | 205/532 |
| 5,258,106 A | * | 11/1993 | Habermann et al. | 205/510 |
| 5,358,556 A | | 10/1994 | Kaner et al. | |
| 5,472,585 A | * | 12/1995 | Dinella et al. | 427/99.5 |
| 5,597,863 A | | 1/1997 | Linder et al. | |
| 5,773,645 A | | 6/1998 | Hochstrasser | |
| 5,876,486 A | | 3/1999 | Steinwandel et al. | |
| 6,579,343 B2 | | 6/2003 | Brennecke et al. | |

(Continued)

FOREIGN PATENT DOCUMENTS

| | | |
|---|---|---|
| DE | 3617280 | 11/1987 |
| EP | 1 935 476 A1 | 6/2008 |

(Continued)

OTHER PUBLICATIONS

T. Sata, Studies on anion exchange membranes having permselectivity for specific anions in electrodialysis—effect of hydrophilicity of anion exchange membranes on permselectivity of anions, Journal of Membrane Science, vol. 167, 2000, pp. 1-31.*

(Continued)

*Primary Examiner* — Harry D Wilkins, III
(74) *Attorney, Agent, or Firm* — The Marbury Law Group, PLLC

(57) ABSTRACT

Carbon dioxide can be separated from gas streams using ion exchange, such as in an electrochemical cell. An anion exchange membrane can be configured to increase the efficiency of the system and to permit the flow of the carbon-containing ions within the system while reducing diffusion of protons and/or hydroxyl ions. A gas stream containing carbon dioxide can be introduced to the system on the cathode side, while a source of hydrogen-containing molecules can be introduced on the anode side. Operation of the system can separate the carbon dioxide from the gas stream and provide it at a separate outlet.

19 Claims, 6 Drawing Sheets

(56) References Cited

U.S. PATENT DOCUMENTS

| | | | |
|---|---|---|---|
| 6,673,737 | B2 | 1/2004 | Mehnert et al. |
| 6,793,711 | B1 | 9/2004 | Sammells |
| 6,908,500 | B2 | 6/2005 | Fisher et al. |
| 6,969,693 | B2 | 11/2005 | Sauvage et al. |
| 7,763,097 | B2 | 7/2010 | Federspiel et al. |
| 2005/0154247 | A1 | 7/2005 | Jong et al. |
| 2006/0100323 | A1 | 5/2006 | Schmidt et al. |
| 2007/0119302 | A1 | 5/2007 | Radosz et al. |
| 2008/0115667 | A1 | 5/2008 | Lee et al. |
| 2009/0159456 | A1 | 6/2009 | Littau |
| 2009/0233155 | A1 | 9/2009 | Littau |
| 2010/0005959 | A1 | 1/2010 | Littau et al. |

FOREIGN PATENT DOCUMENTS

| | | |
|---|---|---|
| JP | 63049232 | 3/1988 |
| WO | WO 2004/104548 A2 | 12/2004 |
| WO | WO 2005/061422 A1 | 7/2005 |

OTHER PUBLICATIONS

Nagarale et al, "Recent Developments on Ion-exchange membranes and electro-membrane processes", Advances in Colloid and Interface Science, vol. 119, Dec. 2005, pp. 97-130.*

Pepper et al, "Properties of Ion-exchange Resins in Relation to Their Structure. Part VI. Anion-exchange Resins derived from Styrene-Divinylbenzene Copolymers", Journal of the Chemical Society, 1953, pp. 4097-4105.*

Okada, T., Nonaqueous anion-exchange chromatography I. Role of solvation in anion-exchange resin, Journal of Chromatography A, vol. 758, Issue 1, pp. 19-28, Jan. 1997.*

Pismenskaya, N., et al, Electrotransport of weak-acid anions through anion-exchange membranes, Desalination, vol. 147, Issues 1-3, Sep. 2002, pp. 345-350.*

Horng et al, "The behavior of polyprotic anions in ion-exchange resins", Reactive and Function Polymers, vol. 35, 1997, pp. 41-54.*

Winnick, J., Marshall, R.D., and Schubert, F.H., "An Electrochemical Device for Carbon Dioxide Concentration. I. System Design and Performance," Ind. Eng. Chem., Process Des. Develop., vol. 13, No. 1, 1974, pp. 59-63.

Scovazzo, P., Poshusta, J., Dubois, D., Koval, C., and Noble, R., "Electrochemical Separation and Concentration of <1% Carbon Dioxide from Nitrogen," Journal of the Electrochemical Society, vol. 150, No. 5, 2003, pp. D91-D98.

Sugiura, K., Takei, K., Tanimoto, K., Miyazaki, Y., "The carbon dioxide concentrator by using MCFC," Jour. of Power Sources, vol. 118, 2003, pp. 218-227.

Lang, C.M., Kim, K., and Kohl, P.A., "High-Energy Density, Room-Temperature Carbonate Fuel Cell," Electrochemical and Solid-State Letters, vol. 9, No. 12, 2006, pp. A545-A548.

Susan, A.B.H., Kaneko, T., Noda, A., and Watanabe, M., Ion Gels Prepared by in Situ Radical Polymerization of Vinyl Monomers in an Ionic Liquid and Their Characterization as Polymer Electrolytes, J. Am. Chem. Soc. 2005, vol. 127, p. 4976-4983.

File History for U.S. Appl. No. 12/049,406.

File History for U.S. Appl. No. 12/168,953.

File History for U.S. Appl. No. 12/136,109.

File History for EP Application No. 09164825.3 as retrieved from European Patent Office Electronic File System on Feb. 10, 2011, 112 pages.

File History for EP Application No. 09161184.8 as retrieved from European Patent Office Electronic File system on Feb. 10, 2011, 97 pages.

* cited by examiner

SEPARATING GAS USING ION EXCHANGE

FIELD OF THE INVENTION

The present invention relates generally to separating gases, and more particularly to the use of ion exchange to efficiently separate one gas from a mixture of gases.

BACKGROUND OF THE INVENTION

Various techniques have been proposed for the separation of carbon dioxide from gas mixtures. For example, Winnick, J., Marshall, R., and Schubert, F., "An Electrochemical Device for Carbon Dioxide Concentration. I. System Design and Performance," *Ind. Eng. Chem., Process Des. Develop.*, Vol. 13, No. 1, 1974, pp. 59-62, describes the use of electrochemical cells for carbon dioxide concentration. These and similar methods use electrochemical or "polarization membranes." These membranes operate on the principle that $CO_2$ is converted to soluble carbonates at high pH and is liberated again at low pH. $CO_2$ is preferentially absorbed on the basic side and released on the acidic side.

It would be advantageous to have improved techniques to separate a gas from a mixture of gases.

SUMMARY OF THE INVENTION

The invention provides various exemplary embodiments, including structures, articles, and methods. In general, the embodiments involve the separation of gases from a mixture of gases by use of ion exchange.

These and other features and advantages of exemplary embodiments of the invention are described below with reference to the accompanying drawings.

DETAILED DESCRIPTION

In the following detailed description, numeric values and ranges are provided for various aspects of the implementations described. These values and ranges are to be treated as examples only, and are not intended to limit the scope of the claims. In addition, a number of materials are identified as suitable for various facets of the implementations. These materials are to be treated as exemplary, and are not intended to limit the scope of the claims.

Many technical and industrial applications exist for gas separation, such as for carbon dioxide. Several examples include life support in closed environments such as spacecraft and submerged vehicles, sweetening of natural gas, and separation of carbon dioxide from power plant flue exhaust. In general, current gas separators used for these and similar applications are highly inefficient, consuming about 10 to 100 times the theoretical minimum energy required for such separation. The present methods of $CO_2$ separation expend about 250 to 2500 kJ or more of energy per mole of $CO_2$ separated. Current methods involve adsorbing $CO_2$ onto a material or reacting $CO_2$ with a solid under one set of operating conditions (such as high pressure and low temperature) and then isolating the solid and decreasing the pressure and/or increasing the temperature. While these methods have the advantages of simplicity and reliability, they are simply too inefficient for many practical applications. For example, in atmospheric $CO_2$ capture, the efficiency is very important because the value of the captured gas is very low and large volumes of air need to be processed. Known methods, such as described in Winnick et al., are relatively inefficient as ion diffusion and $CO_2$ transfer tend to degrade the pH gradient over time. Although the Winnick et al. method is one of the more efficient methods currently known, it is still too inefficient to be a viable option in most applications. Additional energy is required to maintain the gradient.

Carbon dioxide is the main constituent of heat trapping gasses responsible for accelerated climate change. Methods for efficiently extracting $CO_2$ directly from the atmosphere could enable cost effective sequestration or conversion of $CO_2$ to hydrocarbons suitable for use as fuel while still being carbon neutral.

The exemplary implementations below address the above problems in gas separation. They are especially useful in separating carbon dioxide.

Figure 1:
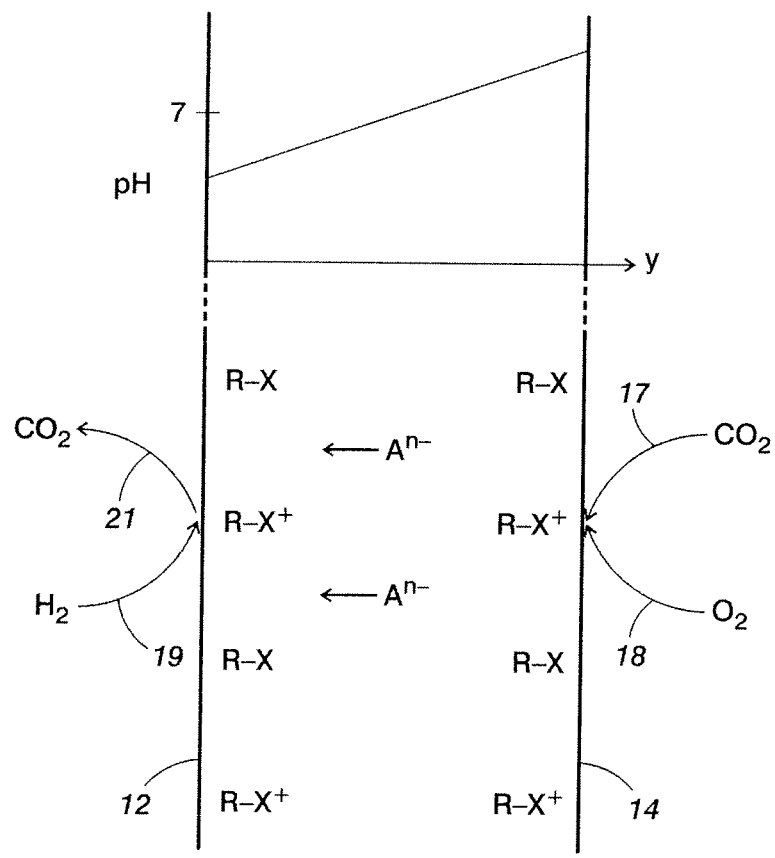
FIG. 1 is a schematic view of the flow of the molecules and ions in separating carbon dioxide, such as within an electrochemical cell.

FIG. 1 shows an electrochemical cell that can be used for gas separation, such as carbon dioxide. A gas, such as air, containing both $CO_2$ (per arrow) 17 and $O_2$ (per arrow 18) is introduced. The side of the cell with the cathode 14 is configured as the basic side of the cell, while the side with the anode 12 is configured as the acidic side of the cell. The $CO_2$ and $O_2$ react to form a carbon-containing ion, represented by $A^{n-}$, and hydroxyl ions, respectively. R and A can be any constituent known to those of ordinary skill in the art. Hydrogen gas (per arrow 19) is fed to the cell where it forms $H^+$ and $e^-$. As a result of the reactions, a pH gradient arises within the cell that creates a basic side near electrode 14, designated the cathode, and an acidic side near electrode 12, designated the anode.

While FIG. 1 shows hydrogen gas as the fuel for the reactions, any hydrogen-containing molecule may be used that when consumed at the anode produces protons. Examples of such materials include methanol and other alcohols, metal hydrides, and methane or other simple hydrocarbon compounds.

For $CO_2$ separation, A will typically be carbonate or bicarbonate ion; $CO_2$ may react with other species to produce other carbon-containing ions. X can be any functional group used in the ion exchange membrane, while n simply denotes the ionization state of the carbon-containing ion. The carbon-containing ion $A^{n-}$ travels across the cell to the acidic side at the anode 12 where it reacts to form $CO_2$ again. The newly formed $CO_2$ 21 is liberated at the anode 12. For example, the reactions may be characterized as follows:

| Anode: | Cathode: |
|---|---|
| $H_2 \rightarrow 2H^+ + 2e^-$ | $\frac{1}{2}O_2 + H_2O + 2e^- \rightarrow 2OH^-$ |
| $HCO_3^- + H^+ \rightarrow H_2O + CO_2$ | $CO_2 + OH^- \rightarrow HCO_3^-$ |

In operation, a pH gradient arises between anode 12 and cathode 14 due to the ionization of $H_2$ and the reaction of $O_2$. The gradient is then maintained by reducing diffusion of $H^+$ and $OH^-$ across the cell. The membrane selectively reduces $H^+$ and $OH^-$ diffusion across the cell, while permitting or promoting carbon-containing ion transport.

These reactions rely on the differential solubility of $CO_2$ at different pH levels and operate independently of electrode potential. Without the ion exchange, $H^+$ and $OH^-$ tend to diffuse freely across the cell. The net effect of this transport would be degradation of the pH gradient across the cell. The pH would decrease at the cathode and increase at the anode.

Figure 2:
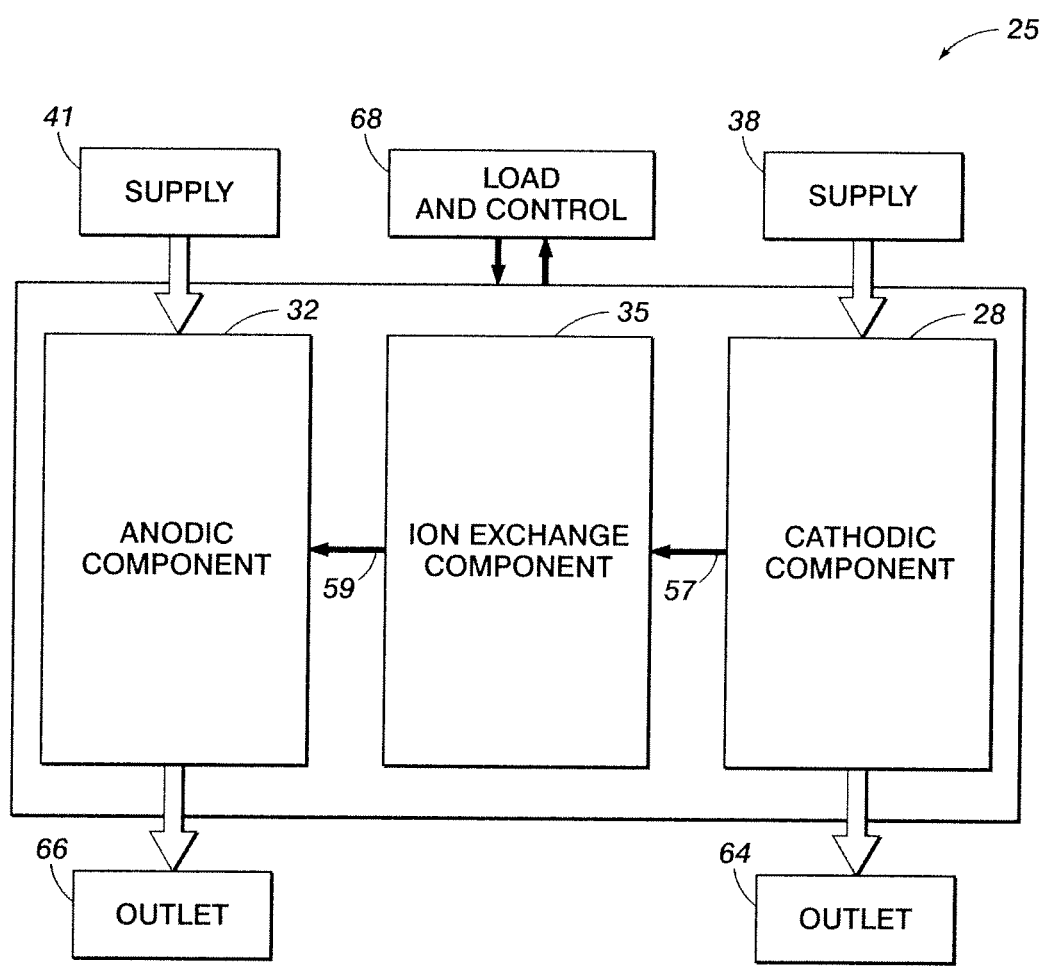
FIG. 2 is a schematic block diagram of a system in which molecules and ions can flow as in FIG. 1.

FIG. 2 shows system 25 in which ion exchange component 35 reduces the degradation of the pH gradient. System 25 includes supply 38 and outlet 64 at cathodic component 28 and supply 41 and outlet 66 at anodic component 32. In operation, a gas that includes carbon dioxide is introduced to cathodic component 28 through supply 38, while hydrogen gas is introduced to anodic component 32 through supply 41. The gas with reduced carbon dioxide content is released from cathodic component 28 through outlet 64. Carbon-containing ions transfer from cathodic component 28 to ion exchange component 35 as shown by arrow 57, and from ion exchange component 35 to anodic component 32 as shown by arrow 59. The carbon-containing ions react at anodic component 32 to form carbon dioxide gas that exits system 25 through outlet 66. In a typical embodiment, system 25 also includes load and control 68 to provide electrical load across components 28 and 32 and to control any other electrical components, such as valves, pumps, and so forth.

Figure 3:
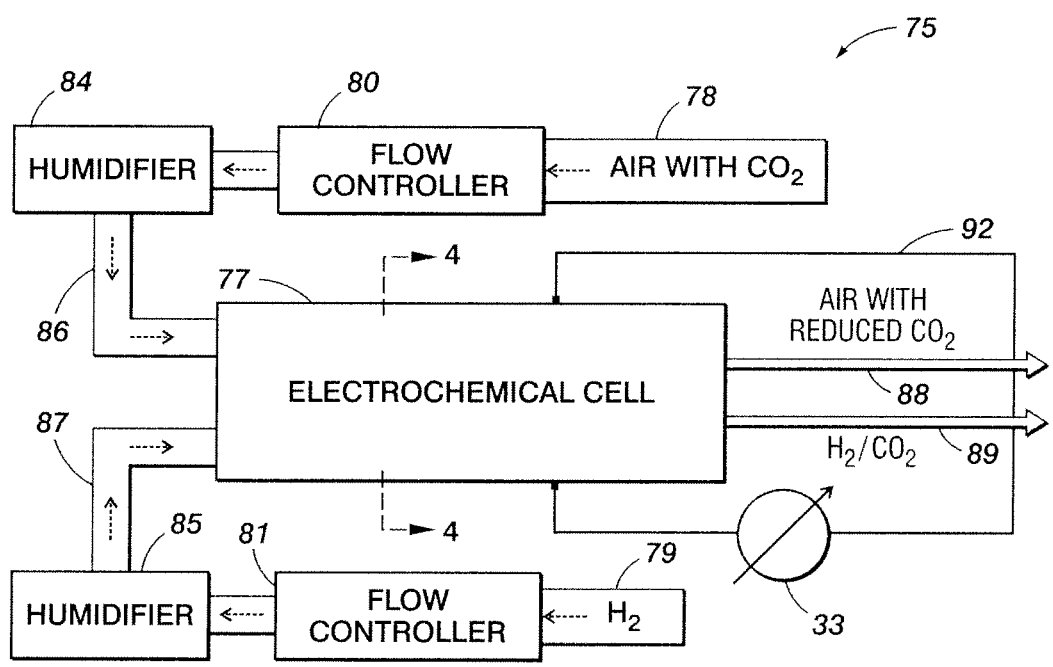
FIG. 3 is a schematic view showing flow paths of gases in a system as in FIG. 2.

FIG. 3 shows system 75, an exemplary implementation of system 25 in FIG. 2. In this implementation, air containing carbon dioxide flows through tube 78. Although FIG. 3 shows the inlet gas being air, other gases containing carbon dioxide could also be used, such as exhausts from industrial processes. On the other side, hydrogen gas flows into the system 75 through tube 79. Each gas stream flows through a respective flow controller 80 or 81 and through a respective humidifier 84 or 85 that controls the relative humidity of the gas stream. From there, the humidified gas streams flow in parallel through respective tubes 86 and 87 into electrochemical cell 77 where the carbon dioxide is separated from the air. Two outlets 88 and 89 are shown from system 75. Reduced carbon dioxide air flows through one outlet 88, while carbon dioxide and excess hydrogen that is not consumed during the process flow out through the other outlet 89. Variable load 33 is attached to electrochemical cell 77 to form circuit 92 that loads current flow through electrochemical cell 77. In operation, load 33 regulates the extent to which $H_2$ is permitted to generate an electrical current within electrochemical cell 77. Variable load 33 may include a battery or other energy storage or conversion device. In this case, variable load 33 is being charged rather than discharged.

Figure 4:
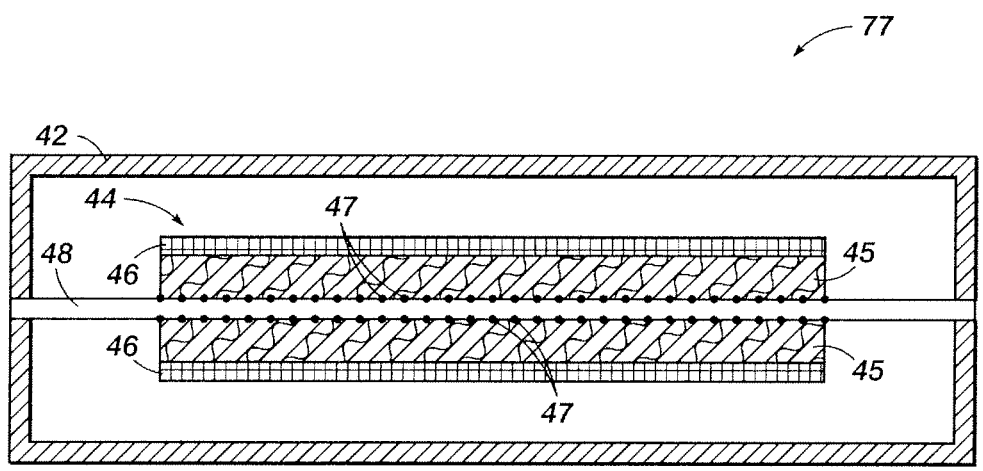
FIG. 4 is a cross-sectional view of the electrochemical cell as in FIG. 3 taken along line 4-4 of FIG. 3.

FIG. 4 shows a cross-section of electrochemical cell 77, an exemplary implementation of cell 77 in FIG. 3. Layered structure 44 is shown within enclosure 42 that can be metal or similar material.

Ion exchange membrane 48 is clamped or otherwise fixed in place within the enclosure 42 with tubes 86 and 88 connected on one side of membrane 48 and tubes 87 and 89 connected on the other, the tubes being shown in FIG. 3. The membrane can include at least one polymer and can be reinforced with expanded polytetrafluoroethylene (PTFE) or glass fibers or other fibrous materials. Examples of anion exchange materials that may be used within the membrane include a styrene/divinylbenzene copolymer matrix with tertiary or quaternary ammonium functional groups such as benzyl trimethylammonium. For example, a primarily quaternary ammonium membrane and a primarily tertiary ammonium membrane are commercially available from Fumatech GmbH under the trade names FTAM and FAP, respectively.

Catalyst layers 47 formed of platinum particles or other material known to those of ordinary skill in the art are located on either side of membrane 48. The catalyst layers increase the efficiency of the system by increasing the amount of $H^+$ and $OH^-$ within the system. The catalyst increases the rate of the fuel reaction of $H_2 \rightarrow 2H^+ + 2e^-$. Any material known or discovered to increase the rate of this reaction may be used as the catalyst. The catalyst layers 47 may be applied by painting, air brushing, or printing.

Gas diffusion layers 45 are located on either side of membrane 48 and catalyst layers 47. The gas diffusion layers permit the gases to diffuse through the pores therein from each of porous conductive layers 46 (described below) to membrane 48. The gas diffusion layers can be formed of a porous electrically conductive material such as carbon paper or carbon cloth and may be infused with a polymer, such as polytetrafluoroethylene (PTFE) in order to help prevent excess water accumulation in the gas diffusion layer.

The reactions that form the carbon-containing ion on the cathode side and for re-forming carbon dioxide gas on the anode side take place at the interface of the gas diffusion layers and the membrane. These reactions do not require the presence of the catalyst or any external applied potential. The platinum catalyst increases the efficiency of the hydrogen-containing molecule and oxygen gas consumption. Carbon-containing ion formation can be aided by the presence of other catalysts, such as carbonic anhydrase. Layers of porous conductor material 46 are located on either side of the gas diffusion layers 45. The porous conductors can be formed of a material that conducts electricity and permits gas diffusion, such as a wire mesh or similar material.

A metal plate with machined gas channels acting as a "flow field", such as are commonly used in fuel cells, may also be used. For example, a flat plate of stainless steel with machined grooves having an inlet at one end and outlet at the other may be used. The grooved surface is placed against the gas diffusion layer defining channels where the gas passes over the gas diffusion layer. This is commonly referred to as the "flow field" in fuel cell art.

As reactions progress at catalyst layers 47, the interfaces of the catalyst layers 47 with the gas diffusion layer 45 and membrane 48 behave similarly to electrodes, with one behaving like a cathode and the other like an anode. In operation, an electric field is therefore formed across membrane 48 between catalyst layers 47 at the interfaces of gas diffusion layers 45 and membrane 48.

Ion exchange membranes can be implemented with polymers that hold a fixed charge on a polymer backbone. The membranes may be homogeneous or heterogeneous. A heterogeneous membrane contains more than one polymer, one of which is typically inert and is added to enhance plasticity or other structural properties of the membrane. The fixed charge tends to exclude or block ions of the same charge, reducing their diffusion while allowing diffusion of counter ions. Thus, when the system is in operation, an anion exchange membrane helps to maintain a pH gradient by reducing the diffusion of protons, thus increasing the efficiency of the carbon dioxide separation. As noted above, the supply of hydrogen and oxygen gases are also necessary to maintain the pH gradient.

Figure 5:
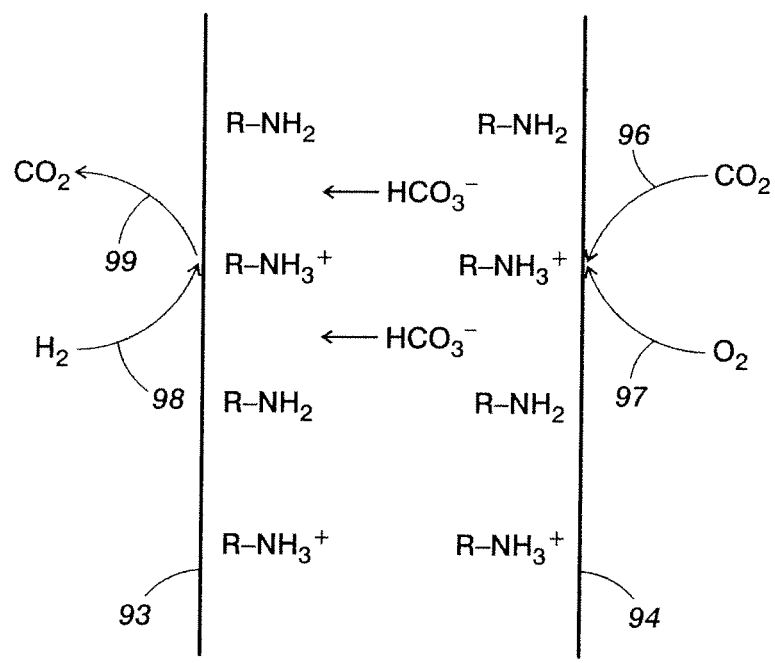
FIG. 5 is a schematic view of an exemplary implementation of the flow of molecules and ions within an electrochemical cell as in FIGS. 3 and 4.

FIG. 5 shows an exemplary implementation using a membrane that includes a modified ion exchange polymer that not only reduces proton diffusion, but also has the ability to further maintain a pH gradient by reducing hydroxyl ion diffusivity. Hydroxyl ions tend to hydrogen bond to the ion exchange membrane which has functional groups capable of forming hydrogen bonds with hydroxyl ions or water in the hydraulic volume associated with the hydroxyl ion. The carbon-containing ion does not hydrogen bond as readily and is able to diffuse more easily through the membrane. Typical strong base anion exchange polymers are less capable of reducing hydroxyl diffusivity, but weak Lewis base-containing polymers are better able to reduce the hydroxyl ion mobility by providing these hydrogen bonding sites. The weak Lewis-base containing polymers also provide recombination sites for the hydroxyl ions in the form of protonated base sites. The carbon-containing ions, however, do not react with these sites. An example of such a polymer would include primary, secondary, or tertiary coordinated amine groups. These functional groups when protonated serve as charged sites to exclude cation or proton diffusion. Further, these protonated sites will act as traps for hydroxyl anions that will reduce diffusion of these groups across the membrane.

FIG. 5 shows anode 93 and cathode 94, which can be at opposite sides of the membrane in an electrochemical cell. A gas, such as air, containing both $CO_2$ (per arrow 96) and $O_2$ (per arrow 97) is introduced at the cathode 94. A polymer containing a coordinated primary amine group is represented by R—$NH_2$, although it is understood that the invention is not limited to a primary amine. The $CO_2$ reacts on the basic side at the cathode with water or hydroxyl ions present in the membrane to form bicarbonate ion, $HCO_3^-$ or carbonate ion $CO_3^{2-}$. The $O_2$ reacts electrochemically at the cathode along with water or hydroxyl ions present in the membrane to produce hydroxyl ions or excess water, respectively. Hydrogen gas 98 is fed to the cell at the anode 93 where it reacts to form protons at anode 93. Some of the protons stick to available amine sites to form R—$NH_3^+$ Most of the protons are hydrated by the water in the membrane. In both cases, they stay near the surface of the anode. They react with carbonate and/or bicarbonate ions directly to form gaseous $CO_2$. The bicarbonate ion $HCO_3^-$ or carbonate ion $CO_3^{2-}$ travels across the cell to the acidic side at the anode 93 where it forms $CO_2$ again. The newly formed $CO_2$ 99 is liberated at the anode 93.

There are a number of different reactions that can happen within the membrane which depend at least in part on the pH. In addition to those described above, there are the reactions which produce and consume carbonate ion ($CO_3^{2-}$) which can predominate when the pH is above about 9. Those skilled in the art will recognize other sources of acid and base groups which can participate in the reactions. For example, the polymer in the membrane may include such groups. The various reactions happen in parallel to varying degrees depending on local conditions.

Figure 6:
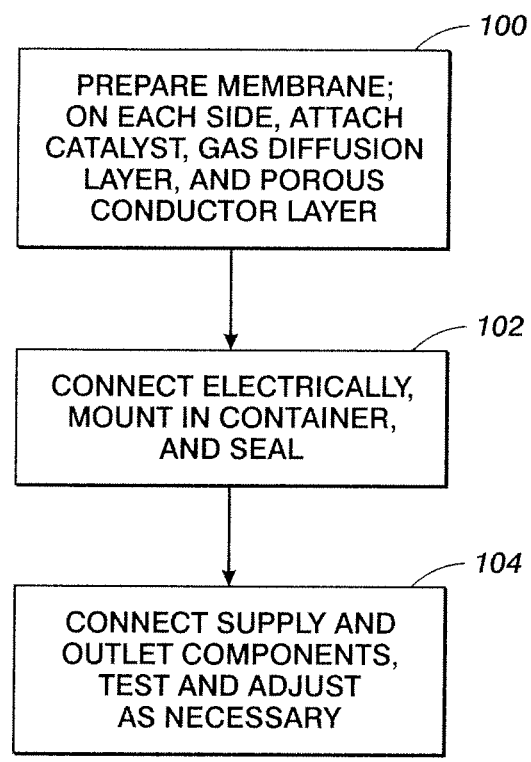
FIG. 6 is a block diagram showing a process for producing a system as in FIGS. 3 and 4.

FIG. 6 shows exemplary steps that can produce a system like those disclosed herein. In the operations in box 100, the membrane is prepared. On each side, the catalyst, gas diffusion layer, and porous conductor layer are attached. In the operations in box 102, the resulting layered structure is connected electrically, mounted in a container, and sealed. Finally, in operations in box 104, the supply and outlet components are connected. The system can be tested and adjusted as necessary.

The particular order of any of the steps for preparing the various components of the system is not critical. Indeed, they can be performed in any particular order. For example, in FIG. 4, although the layered structure 44 is described as being prepared as a catalyst layer 47 covering the membrane 48, it could just as easily be constructed as the catalyst layer 47 covering the gas diffusion layer 45 which is then attached to the membrane 48. The catalyst layer 47 need not be present as a complete layer at all, but must simply be present in sufficient quantity and thickness to facilitate the desired chemical reactions.

If necessary or desirable, the system can easily be designed to permit control of the temperature and pressure of the various gases as they move throughout. A gas analyzer may be used to test the various outlet gases to determine whether the system is operating as desired. The outlet gases may be used in any application desired. The outlet gases may be pumped to another location or used in reactions or other applications nearby.

The system and methods disclosed herein can be used in combination with other systems and methods to improve the efficiency thereof.

EXAMPLE

Carbon paper loaded with 5% PTFE was used for the gas diffusion layers (GDL). Platinum particles suspended in a PTFE solution were painted onto one of the faces of each of two GDL's to form the electrodes, which were then allowed to dry. Separately, a commercial ion exchange membrane, FTAM, was soaked in Cesium Carbonate to condition it before use. This is necessary to replace any other anions which might be left over from the membrane manufacturing process that would interfere with carbonate diffusion in the membrane. The Pt particle-coated electrode faces of the GDL's were then placed against the ion exchange membrane to form a stack that was then placed into the cell. The conductive plates, as described above, were pushed against the GDL's and the cell was sealed.

Faradaic efficiencies of 15% to 20% were observed at a current density of 1 $mA/cm^2$ using a FTAM membrane and the following conditions: 400 ppm input $CO_2$ concentration in air, at 25° C., 3 slm Air and 70 sccm $H_2$ flow rate at the anode.

Faradaic efficiency is the energy efficiency with which a species is electrolyzed at a given charge. High Faradaic efficiencies suggest that the process requires lower energy to complete the reaction making the process more feasible. In this case, Faradaic efficiency is a measure of the ratio of $CO_2$ capture rate over the electric current through the system. A Faradaic efficiency of 100% means exactly one $CO_2$ molecule is captured for every electron passing through the system (one hydrogen molecule makes two electrons).

As used herein, a "layer" is a thickness of material, whether or not patterned in any way. A layer "includes" a specified type of material if material of the specified type is present in any part of the layer; a layer is "of" a specified type of material if material of the specified type is predominant throughout the layer. A layer may be homogeneous or its composition or characteristics may vary. A layer may include two or more layers or parts of layers within it, sometimes referred to as "sublayers". An "insulating layer" is a layer that is electrically insulating, while a "conductive layer" is a layer that is electrically conductive.

A "layered structure" refers herein to a structure that includes layers, such as microfabricated or thin film layers. A layered structure can be on a substrate or other support structure; a substrate can itself be one of the layers in a layered structure, and the substrate may in turn include layers within its structure. A membrane, for example, can be a substrate on opposite ends of which a layered structure can be formed.

An "electrode" as used herein refers to the last conductor that is in intimate contact with an electrolyte (e.g., an electrolytic solution in an electrochemical cell's membrane). In the exemplary implementation described herein, the catalyst-coated surface of the gas diffusion layer is the electrode.

A structure or component is "directly on" or sometimes simply "on" a surface when it is both over and in contact with the surface. A structure is "fabricated on" a surface when the structure was produced on or over the surface. A process that produces a layer or other accumulation of material over or directly on a surface, such as a substrate's surface, can be said to "deposit" the material.

The term "membrane" refers to a structure that is permeable to fluids, such as gas, liquid, or aerosol. A membrane may be "semipermeable" meaning that it is permeable to some substances and impermeable to others.

The term "ion exchange" refers an exchange of ions between two electrolytes or between an electrolyte solution and a complex.

The term "ion exchange sites" refers to locations having fixed charges where ion exchange occurs. These locations may be, for example, within the membrane.

The terms "cathodic component" and "anodic component" refer, respectively, to structures or materials at which reactions can occur, in which case they can act as electrodes. The "cathodic component" is the area at which reduction occurs, while the "anodic component" is the area at which oxidation occurs.

The term "electrochemical cell" refers to a vessel in which complementary reactions take place, one releasing electrons and the other accepting electrons.

"Carbon-containing ions" simply refer to ions that contain the element carbon. They may be anions or cations with the ionization occurring on the carbon atom or on another atom within the ion.

Although the invention has been described herein primarily for the separation of carbon dioxide from other gases, the invention is not so limited. As understood by those of ordinary skill in the art, the techniques described could be used to separate other gases.

While the invention has been described in conjunction with specific exemplary implementations, it is evident to those skilled in the art that many alternatives, modifications, and variations will be apparent in light of the foregoing description. Accordingly, the invention is intended to embrace all other such alternatives, modifications, and variations that fall within the spirit and scope of the appended claims.

What is claimed is:

1. A system to separate carbon dioxide from a gas comprising:
    a cathodic component and an anodic component with a region between them and structured such that, with oxygen and carbon dioxide at the cathodic component and hydrogen-containing molecules that can provide protons at the anodic component, reactions occur producing carbon-containing ions; the carbon-containing ions transporting from the cathodic component to the anodic component and reacting at the anodic component to form carbon dioxide; and
    an ion exchange component comprising one or more ion exchange sites between the cathodic component and the anodic component, the ion exchange component comprising a polymer having at least one fixed charge, and at least one functional group chosen from at least one weak Lewis base capable of forming hydrogen bonds with hydroxyl ions,
    the ion exchange sites being configured to permit transport of the carbon-containing ions between the cathodic component and the anodic component,
    wherein the at least one fixed charge is sufficient to exclude or block ions of the same charge.

2. The system of claim 1, wherein the ion exchange component includes one or more of an ion exchange membrane and an ion exchange polymer.

3. The system of claim 1, wherein the ion exchange component comprises an anion exchange polymer.

4. The system of claim 3, wherein the anion exchange polymer includes one or more primary, secondary, or tertiary coordinated amine group.

5. The system of claim 1, further comprising an electrochemical cell, wherein the reactions produce a pH gradient between the cathodic component and the anodic component and the pH gradient has a natural decay rate.

6. The system of claim 5, wherein the electrochemical cell includes a layered structure, the anodic and cathodic component are on opposite sides of the layered structure, and the membrane component is between the anodic and cathodic components.

7. The system of claim 6, wherein the ion exchange component includes:
    a membrane with first and second opposing sides;
    first and second catalyst layers on the first and second opposing sides, respectively;
    first and second gas diffusion layers over the first and second catalyst layers, respectively, each gas diffusion layer permitting gas diffusion to the catalyst; and
    first and second porous conductor layers disposed over the first and second gas diffusion layers, respectively, the first and second porous conductor layers being electrically connectable to a load.

8. The system of claim 7, wherein:
    the membrane is an anion exchange membrane that includes coordinated amine groups;
    the first and second catalyst layers are formed of platinum;
    the first and second gas diffusion layers are formed of carbon paper infused with polytetrafluoroethylene; and
    the first and second porous conductor layers are formed of wire mesh.

9. The system of claim 1, wherein:
    the ion exchange component comprises:
        a membrane that includes:
            a permeable support layer with first and second opposing surfaces and
            one or more ion exchange sites within the support layer;
    the anodic component includes a first catalyst layer on the first opposing surface and a first electrically conductive structure over the first catalyst layer; and
    the cathodic component includes a second catalyst layer on the second opposing surface and a second electrically conductive surface over the second catalyst layer, each electrically conductive structure being electrically connectable to a load and permitting gas diffusion to the catalyst layers.

10. The system of claim 9, further comprising circuitry to connect the first and second electrically conductive structures to the load.

11. The system of claim 9, wherein the first catalyst layer and the first electrically conductive structure comprise an anodic component and the second catalyst layer and the second electrically conductive structure comprise a cathodic component.

12. The system of claim 10 further comprising an enclosure within which the membrane is sealed.

13. The system of claim 12, and further comprising:
a source of gas containing a first amount of carbon dioxide and an outlet for gas containing an amount of carbon dioxide lower than the first amount near the cathodic component; and
a source of hydrogen gas and an outlet for carbon dioxide and unused hydrogen gas near the anodic component.

14. The system of claim 9, wherein the support layer comprises a styrene/divinylbenzene copolymer matrix with benzyl trimethylammonium functional groups.

15. A method of separating carbon dioxide from a gas using the system of claim 1, the method comprising:
reacting the gas at the cathodic component to form the carbon-containing ions;
transporting the carbon-containing ions through the ion exchange component that includes the ion exchange sites between the cathodic component and the anodic component; and
reacting the carbon-containing ions at the anodic component to form the carbon dioxide;
wherein the at least one fixed charge excludes or blocks transport of protons between the anodic component and the cathodic component, and the at least one functional group forms hydrogen bonds with hydroxyl ions transported between the cathodic component and the anodic component.

16. The method of claim 15, further comprising reacting oxygen at the cathode and hydrogen-containing molecules that can provide protons at the anodic component, which reactions produce a pH gradient.

17. The method of claim 15, wherein reacting the gas comprises reacting the gas with hydroxyl ions or water to produce the carbon-containing ions.

18. The method of claim 17, wherein the reaction of the gas that includes carbon dioxide occurs on a first side of a membrane and the reaction of the carbon-containing ions occurs on a second side of a membrane; the method further comprising supplying oxygen gas to the first side of the membrane and hydrogen gas to the second side of the membrane.

19. The method of claim 17, wherein the at least one fixed charge excludes or blocks transport of protons, and the at least one functional group forms hydrogen bonds with hydroxyl ions.

* * * * *